(12) United States Patent  
Cheevarunothai et al.

(10) Patent No.: US 7,786,855 B2
(45) Date of Patent: Aug. 31, 2010

(54) MOBILE SYSTEM AND METHOD FOR TRAFFIC DETECTOR SIMULATIONS

(75) Inventors: Patikhom O. Cheevarunothai, Lynnwood, WA (US); Yinhai Wang, Seattle, WA (US); Nancy L. Nihan, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 1052 days.

(21) Appl. No.: 11/462,878

(22) Filed: Aug. 7, 2006

(65) Prior Publication Data

US 2007/0030171 A1    Feb. 8, 2007

Related U.S. Application Data

(60) Provisional application No. 60/706,341, filed on Aug. 8, 2005.

(51) Int. Cl.
*G08G 1/09* (2006.01)
*G08G 1/00* (2006.01)
*G06G 7/76* (2006.01)

(52) U.S. Cl. .................. 340/515; 701/117; 340/907; 340/917; 340/933

(58) Field of Classification Search .............. 701/117, 701/118, 119; 340/515, 906, 907, 908, 909, 340/910, 915, 916, 917, 924, 926, 931, 933, 340/934, 935
See application file for complete search history.

(56) References Cited

U.S. PATENT DOCUMENTS 6,172,617 B1 * 1/2001 Bullock .............. 340/909

2004/0174274 A1 * 9/2004 Seabury et al. .......... 340/941

OTHER PUBLICATIONS

Johnson et al, Controller Interface Device (CID) II, Nov. 2001, National Institute for Advanced Transportation Technology, University of Idaho.*
CORSIM User Manual, Aug. 20, 1996, U.S. Department of Transportation, Federal Highway Administatrion, Version 1.01.*
Hajkova, Graphical Support of the Traffic Simulation System, May 2005, University of West Bohemia, Department of Computer Science and Engineering.*
"Model 337 Controller Cabinet." Specification Sheet. McCain: The Power of Ingenuity. Vista, CA. Oct. 2005. 1pg.

* cited by examiner

*Primary Examiner*—Khoi Tran
*Assistant Examiner*—Spencer Patton (57) ABSTRACT

Traffic induction loop simulator (LOOPSIM) software, and a system and method designed for traffic research and education. The system is able to generate output signals in response to previously recorded real traffic events or simulated traffic. If directly connected to a controller cabinet or a traffic event data collection system, LOOPSIM can be used to simulate output signals from loop detectors and to test algorithms executable in the controller, or to test the performance of a traffic data collection/monitoring system. LOOPSIM can simulate different predefined patterns of traffic distributions and replay loop event data recorded by a detector event data collection (DEDAC) system or an advanced loop event data analyzer (ALEDA) at a pace responsive to controller feedback. Using LOOPSIM, many traffic system tests can be conducted for multi-purpose traffic control applications, and traffic arrival patterns can be generated for researchers and educators to test theoretical models.

21 Claims, 10 Drawing Sheets

MOBILE SYSTEM AND METHOD FOR TRAFFIC DETECTOR SIMULATIONS

RELATED APPLICATION

This application is based on a prior provisional application, Ser. No. 60/706,341, filed on Aug. 8, 2005, the benefit of the filing date of which is hereby claimed under 35 U.S.C. §119 (e).

GOVERNMENT RIGHTS

This invention was made with U.S. Government support under grant No. DTRS99-g-0010 Mod 4, Mod 5, and Mod 6, awarded by the U.S. Department of Transportation. The U.S. Government has certain rights in the invention.

BACKGROUND

Inductive loops are the most widely deployed traffic sensors and serve as the standard form of traffic detection in the existing road infrastructure. They are a major data source for Advanced Traveler Information Systems (ATIS) and Advanced Traffic Management Systems (ATMS). Most actuated intersection signal control systems, freeway monitoring systems, and traffic event data collection systems use loop detectors for traffic detection. Loop detectors may be deployed as single loops to measure traffic volume and lane occupancy or dual loops to collect speed and vehicle length data in addition to the single-loop measurements.

Figure 1A:
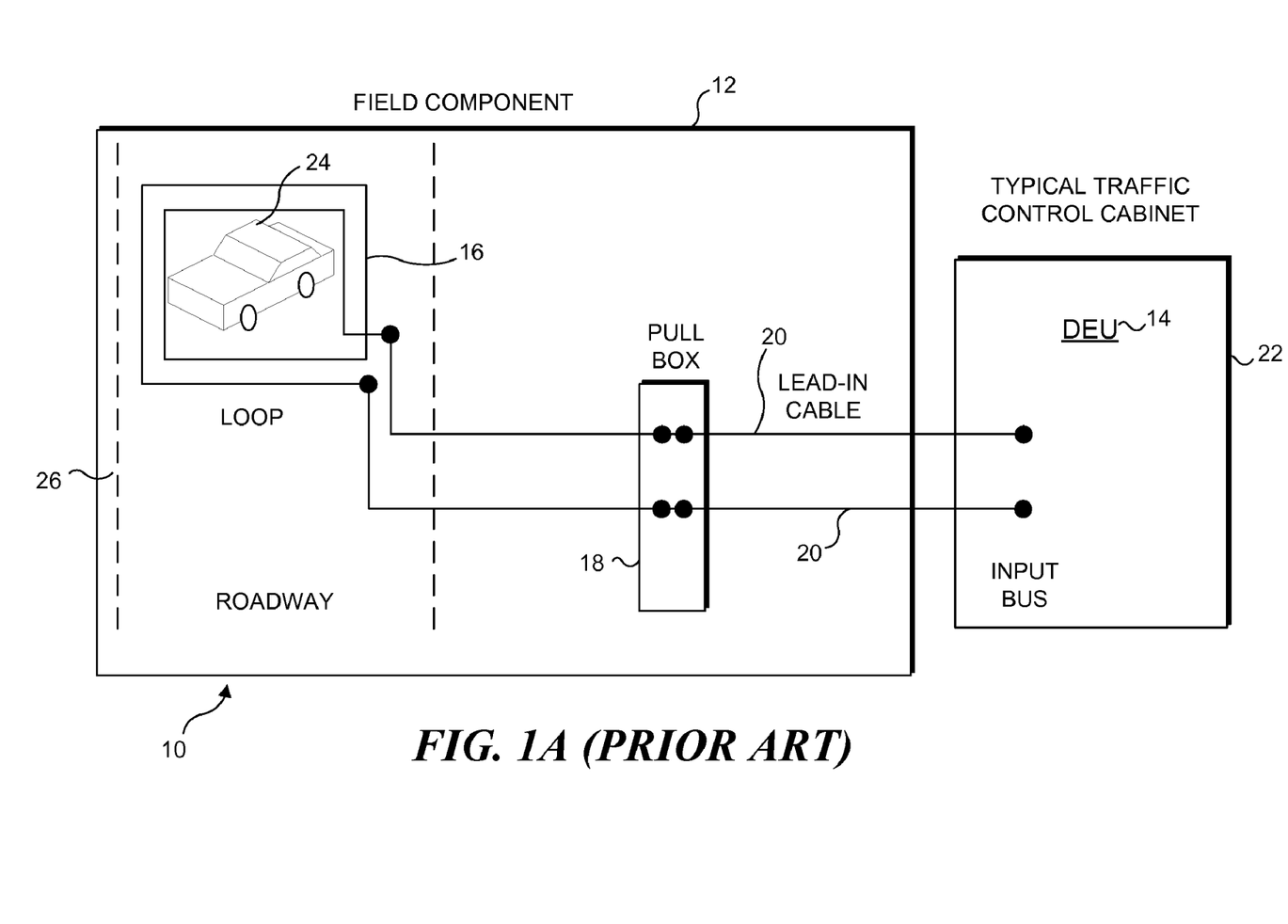
FIG. 1A (Prior Art) is a schematic drawing showing exemplary components of a conventional inductive loop detector system.

FIG. 1A (Prior Art) shows the components of an exemplary inductive loop detection system 10. An inductive loop detector contains two parts, including a field component 12 and a detector electronics unit (DEU) 14. The field component includes one or more turns of insulated loop wire 16 wound in a shallow slot sawed into the pavement, a pull box 18 at curbside, and a lead-in cable 20 that connects the pull box and the DEU. The DEU is housed in a controller cabinet 22.

Each loop detector is a tuned electrical circuit of which loop wire 16 is the inductive element. When a vehicle 24 drives over the loop wire in a roadway 26, eddy currents are induced around the peripheral metal of the vehicle. Although the iron mass of the vehicle's engine, transmission, or differential will increase the loop inductance due to the ferromagnetic effect, the decrease in inductance from the eddy currents more than offsets the increase from the ferrous mass, and the net effect of the vehicle's presence is an overall reduction in loop inductance. Therefore, when a vehicle is on top of a loop detector, it decreases the inductance of the loop. This decrease in inductance then triggers the DEU's output relay or solid state circuit which, in turn, switches the output voltage to the controller to a low level (close to 0 v), signifying that a vehicle's presence has been detected.

Typically, a controller scans loop detector outputs 60 times a second or at 60 Hz. To assure the effectiveness of actuated intersection signal control systems, freeway monitoring systems, and traffic event data collection systems, hardware and software of the systems should be tested before deployment. However, research laboratories, where these tests are typically conducted, generally do not have the field component of a loop detector system and, therefore, may not have live loop inputs for the tests. Although controller cabinets have some built-in test features, system tests enabled by these features tend to be relatively simple and insufficient to provide required data.

The Controller Interface Device (CID) developed by the National Institutes of Advanced Transportation Technology (NIATT) provides a data exchange interface between computers running simulation software and controllers, so that signal timing plans can be tested with controller hardware in a laboratory before being deployed in the field. The CIDs have enabled hardware-in-the-loop simulations (HITLS) and made traffic simulation results more reliable. However, CIDs are not designed for simulating loop event data for in-laboratory research and education. The frequency of providing loop event data from a CID depends on the microscopic simulation software that drives it. Typically, a microscopic simulation software package has a deterministic frequency of recalculating the position of each vehicle between 1 and 10 Hz, which limits the time resolution of loop event data to the range from about $\frac{1}{10}$ to about 1 second. This resolution is much lower than the $\frac{1}{60}$ second resolution level for most loop detection systems. Additionally, using a CID for loop event data simulation requires purchasing both simulation software and a CID, which can easily cost around $3,000 or more. Therefore, a loop detector simulator that can generate precise real-time live loop inputs to controllers and traffic event data collection systems at an affordable cost would be desirable for in-laboratory traffic research and training, as well as for other functions.

Testing of traffic control algorithms on an operating controller at an intersection is typically a labor-intensive work under considerable pressure, because any failure may cause significant interruptions to the traffic stream and induce accidents. Therefore, it would be desirable to facilitate in-laboratory testing of controllers and algorithms running on them before onsite deployment of these components and software.

SUMMARY

An exemplary affordable LOOP detector SIMulator (LOOPSIM) has been developed by the Smart Transportation Applications and Research Laboratory (STAR Lab) at the University of Washington (UW), a new ITS laboratory sponsored by Transportation Northwest (TransNow) and the UW Department of Civil & Environmental Engineering. LOOPSIM was designed to enable inductive loop detector outputs when the field component is absent. These outputs can be either simulated loop detector actuations or actual loop events in the form of data that are replayed from a recorded detector actuation sequence. The event data replay function allows conditional release of recorded events for managed traffic emulation. This function enables interactions between LOOPSIM and traffic controllers and makes LOOPSIM capable of evaluating the performance of adaptive signal control systems using field recorded traffic arrival data.

LOOPSIM is a computer application with a supporting data communication device, executable, for example, on Microsoft Corporation's Windows 2000™ operating system, and on other compatible operating systems. If properly connected to a controller cabinet, LOOPSIM and the DEU can form a virtual inductive loop detector. The only difference between this virtual loop detector and a real inductive loop is the method of actuating a call. The real inductive loop's DEU senses the inductance change from the presence of a vehicle, but the virtual loop places a call through the computer program of LOOPSIM and its communication device.

A controller cannot tell if a received call was from a virtual loop or a real loop. Like a real inductive loop, a virtual loop can be used to provide live inputs to controllers. Similarly, if connected properly to a traffic event data collection system, e.g., to an advanced loop event data analyzer (ALEDA), LOOPSIM can send a live loop call to test the performance and accuracy of the traffic event data collection system. The traffic event data collection system cannot differentiate a call from a real loop or LOOPSIM. Additionally, since loop detector inputs through a virtual loop are controllable, a virtual loop can also be used to simulate inputs from traffic streams with different characteristics, which can be a very important feature, because special tests that require inputs from traffic flows with specific traffic conditions can be designed and conducted with the aid of LOOPSIM. Such tests may not be feasible with real loop detectors whose outputs are generally induced by uncontrollable traffic patterns and are not easily verified. Furthermore, input data that were provided by monitoring the input from a loop detector and storing the signal as digital logic levels with LOOPSIM can also be employed to provide a simulated input to a controller to replicate known traffic flow on a roadway for use in testing algorithms and other facets of a system in the laboratory. Consequently, LOOPSIM offers an advantage to researchers and educators, who can cost-effectively set up a virtual loop detector, or replay pre-recorded traffic event data at a desired pace responsive to controller feedback (interactive simulation), and thereby, intentionally designate a traffic flow with desired characteristics or with characteristics like those on an actual roadway for controlled laboratory studies in line with the purpose of their testing or training.

One of the motivations for developing this technology was to make the testing of a controller and of controller-based algorithms possible in a laboratory with high accuracy and at an affordable cost. LOOPSIM is a computer-based system that implements an innovative idea to bridge the gap between in-laboratory research and applications of an onsite traffic control device. LOOPSIM is capable of generating inductance loop detector actuations in a way that either emulates true traffic situations or rigously follows a theoretical distribution of vehicle arrivals. The design of software and hardware used in this embodiment makes LOOPSIM a unique application for in-laboratory research and education.

The LOOPSIM software application will control its hardware components (a digital input/output (I/O) adapter and a reed relay circuit unit in one embodiment) to generate virtual inductive loop signals. Users can employ the LOOPSIM software to generate virtual loop signals as desired. The electrical signals from the digital I/O adapter have sufficient power for driving a reed relay circuit unit at a relatively high frequency. The reed relay circuit is able to change state, and to deliver, for example, a signal (of either about 24 volts or about 0 volts DC) to controllers to evaluate defined traffic flow conditions and for other purposes.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIGS. 5A and 5B are histograms showing sent data and received data in the vehicle arrival pattern simulations test, wherein FIG. 5A illustrates an exemplary histogram of data generated and sent by LOOPSIM, and FIG. 5B illustrates an exemplary histogram of data received by an Advanced Loop Event Data Analyzer (ALEDA) system;

FIGS. 6A and 6B are graphs of sent and received data in an exemplary roadway traffic emulations test, wherein

DESCRIPTION

Figures and Disclosed Embodiments are not Limiting

Exemplary embodiments are illustrated in referenced FIGURES of the drawings. It is intended that the embodiments and FIGURES disclosed herein are to be considered illustrative rather than restrictive.

Overview

An embodiment of the concepts described herein is directed to an affordable traffic induction LOOP SIMulation system (LOOPSIM) designed for traffic research, education, and control plan evaluation. LOOPSIM is capable of generating output events of loop detectors. If directly connected to a controller cabinet or a traffic event data collection system, LOOPSIM can be used to simulate calls from loop detectors and test algorithms executable in the controller or to test the performance of the traffic data collection system. A traffic controller cabinet comprises a rack mount enclosure that includes an Input File, a controller, and an Output File. The hardware that receives the loop detector input and sends the detected signal onto the controller is referred to in this art as an "Input File," and the hardware that takes the controller output as its input and completes the necessary circuit for controlling the traffic lights is referred to as an "Output File." Clearly, the terms "Input File" and "Output File" as used in the traffic controller art do NOT refer to software or data files, but instead, are hardware components that process input signals and provide output signals, respectively. The Input File includes DEUs and also includes a 24 VDC power supply that is employed to provide the 24 volt signal corresponding to a loop signal. This voltage signal can be connected to external reed relay contacts for use by the LOOPSIM system to simulate LOOPSIM input signals, as discussed below.

LOOPSIM can also be used to simulate different patterns of traffic streams and replay loop event data recorded by the detector event data collection (DEDAC) system or the ALEDA system in an interactive manner, with the controller when needed. With the aid of LOOPSIM, traffic control hardware and software tests can be conducted in laboratories or in the field with shorter testing time and greater accuracy, which offers an advantage to traffic engineers, researchers, and educators, who can designate traffic characteristics in line with the purpose of the testing or training. LOOPSIM is a computer application that is executable on Microsoft Corporation's Windows 2000™ operating system, and on other compatible operating systems. It was tested with a Model 332 controller cabinet equipped with a Type 170 controller and the ALEDA system. The test results indicate that LOOPSIM can accurately simulate loop detector actuations for freeway and arterial applications. The software component of the LOOPSIM system can control the PC-CARD-D24/CTR3 digital I/O card to send digital logic level signals of zero or five volts to a reed relay circuit. These digital logic level signals function as switch commands to change the state of the reed relays in the reed relay circuit between "ON" and "OFF" conditions. If the relays are ON, the high voltage level (i.e., 24 volt) signals from the Input File will be input to the traffic controller. This state corresponds to the condition of unoccupied inductive traffic loop detectors. In contrast, the higher voltage signals will be cut out and instead, the zero volt signals will be sent to the traffic controller, if the relays are OFF. This state corresponds to the condition of inductive traffic loop detectors that have detected the presence of a vehicle, i.e., the condition of an occupied inductive traffic loop detector.

Figure 1B:
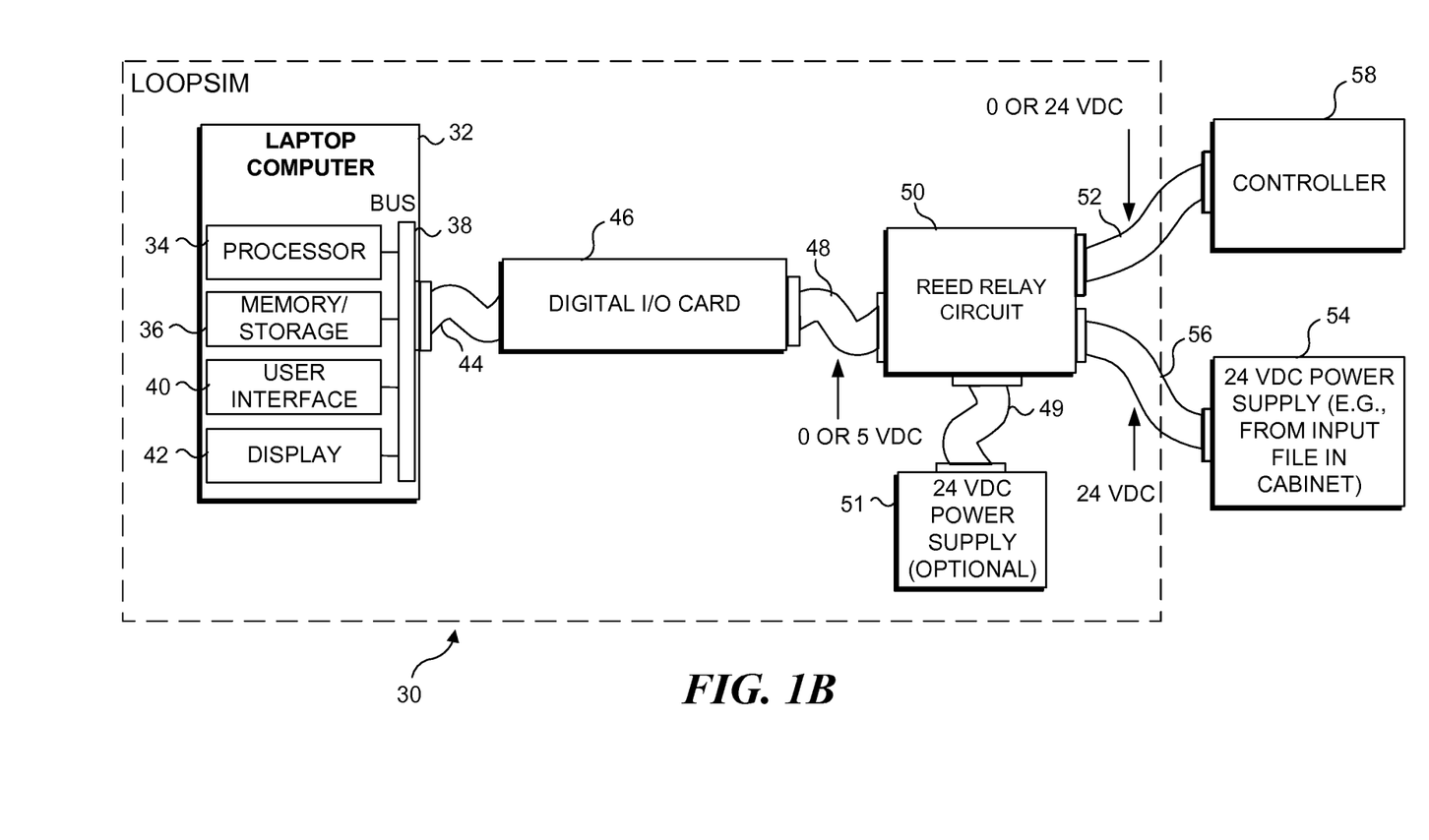
FIG. 1B is a schematic block diagram illustrating an exemplary embodiment of the hardware architecture (referred to herein as "LOOPSIM")

As shown in FIG. 1B, an exemplary embodiment of a LOOPSIM system 30 includes the following devices:

1. a laptop computer 32 on which the LOOPSIM software is installed;
2. a digital Input/Output (I/O) adapter card 46;
3. a relay circuit unit 50 (which in an exemplary embodiment, includes a plurality of reed relays, although it will be understood that solid state switches or other suitable switching devices could instead be used);
4. a 24-VDC power supply 54 (alternatively, an optional 24 VDC power supply 51 can be included with the relay circuit unit for use instead of this 24 VDC unit provided for the DEUs of the Input File); and
5. connection cables 44 and 48 that respectively extend between laptop computer 32 (e.g., a Personal Computer Memory Card International Association (PCMCIA) port or a universal serial bus (USB) port) and digital I/O card 46, and between digital I/O card 46 and relay circuit unit 50; if optional 24 VDC power supply 51 is being used, a connection cable 49 can be employed to connect it to the relay circuit unit.

LOOPSIM system 30 is configured to couple with a traffic controller 58 directly via a connection cable 52, or indirectly with an Input File in a control cabinet via a connector cable 56. The Input File is connected to the controller internally in the traffic control cabinet. Machine language instructions for implementing LOOPSIM functionality are stored in a memory/storage 36 within laptop computer 32. Also included in the laptop computer are a processor 34 that executes the machine instructions to perform the functions of the LOOPSIM software, a user interface (i.e., keyboard, mouse or other pointing device) 40, and a display 42 on which a graphic user interface is displayed in cooperation with an operating system executed by processor 34, to enable user input and to display results of the functions provided by the LOOPSIM software program and related modules. The components of the laptop computer communicate over a bus 38, which is also connected to connector cable 44 through a PCMCIA port or a USB port (not separately shown).

System Components and Functions

To simulate the output of an inductive loop to controllers and traffic event data collection systems, LOOPSIM should have two output stages, including a high voltage state (e.g., about 24 volts), and a low voltage state (e.g., about 0 volts). The high voltage state represents the "off" status of an inductive loop (i.e., no vehicle is on the loop) and the low voltage state represents the loop's "on" status (i.e., when a vehicle is on or proximate to the loop). Since communication ports of computers typically handle voltages between 0 volts and 5 volts, an external power supply at the 24 volts level is needed to meet the output requirements.

Considering that the Model 332 traffic control cabinet is most widely used in Washington State, the LOOPSIM prototype developed at the University of Washington was intended to be used with a Model 332 traffic control cabinet having a Type 170 controller. The DEUs used were 222-series loop amplifier cards. When the field component of an inductive loop detector is missing, the DEU stays in the "open loop" status, which is typically a result of physical loop wire or connection failures. The DEU output voltage is low under the "open loop" status. However, if a DEU is unplugged from the control cabinet, its corresponding output channels in the Input File will remain at the high voltage that indicates no physical loops are connected to the channels. This feature is standard for all Model 332 traffic control cabinets, and the high voltage of the Input File is used as the external power supply for high voltage output of LOOPSIM. In the Model 332 traffic control cabinet, the DEU output signals are available for the Type 170 controller to poll at the Input File.

Figure 2:
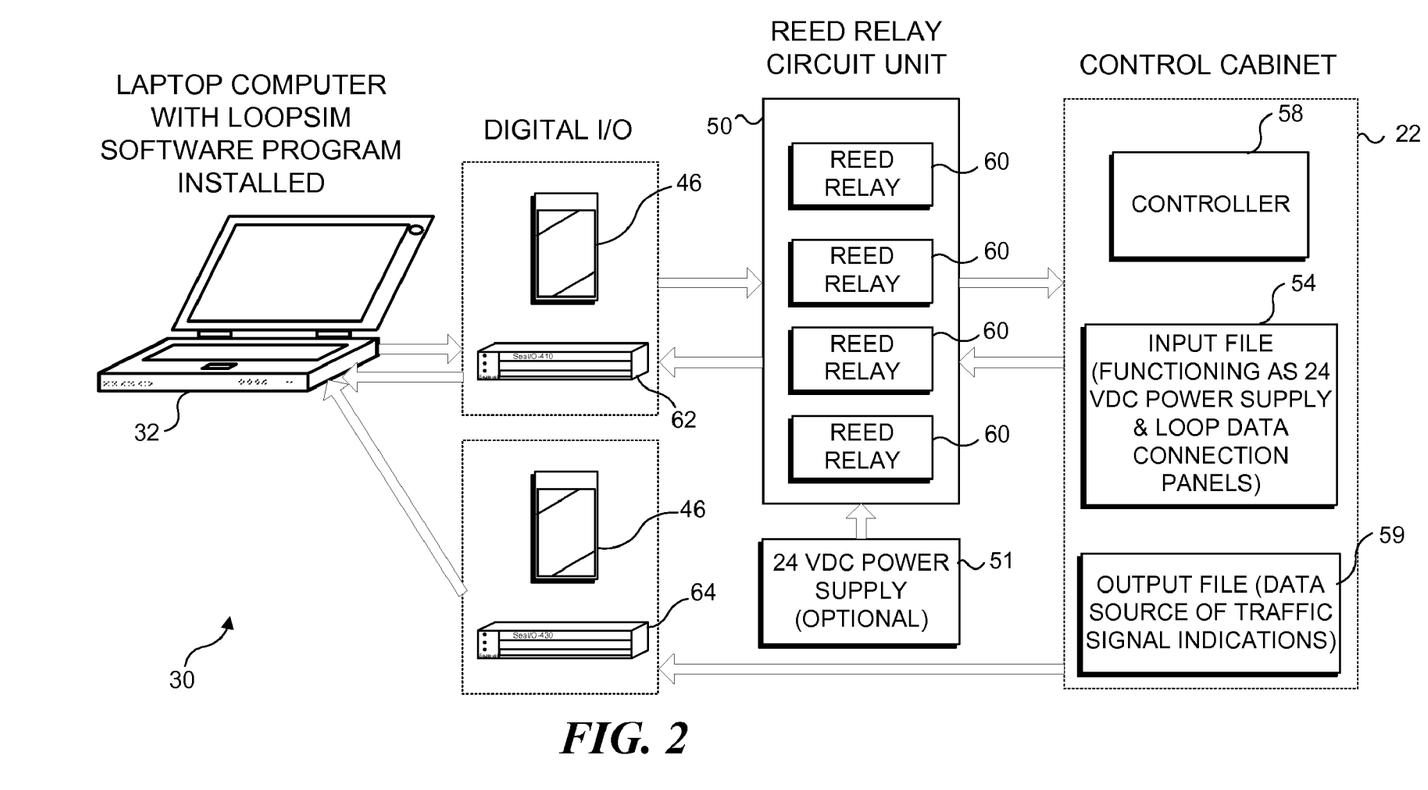
FIG. 2 illustrates an example of LOOPSIM's hardware components.

Referring to FIGS. 1A and 2, LOOPSIM is placed between the Input File and the Type 170 controller 58 of a control cabinet 22. Also included in control cabinet 22 is a data source of traffic signal indications, which can be previously recorded from actual traffic flow conditions in a roadway, or can be predefined to provide a desired traffic flow characteristic.

The illustrated connection of LOOPSIM to the control cabinet does not require any further wiring change in the cabinet. When LOOPSIM simulates a call (or the "on" status), it simply cuts the Input File out of the circuits and sends a low voltage signal to the controller. If the "off" status is simulated, LOOPSIM cuts itself out of the circuit using reed relays 60 that are included in a reed relay circuit unit 50 to make the controller directly connect to the Input File whose voltage stays at 24 volts. A traffic event data collection system can be connected to LOOPSIM in a similar manner.

Specifically, an exemplary embodiment of LOOPSIM is designed to contain the following four components (see FIG. 2).

laptop computer 32 with a PCMCIA port or a universal serial bus (USB) port. In one exemplary implementation, the configuration of the laptop computer includes Microsoft Corporation's Windows 2000™ (or a compatible operating system), an Intel Corp. Pentium 4™ processor, and 512 MB of Double Data Rate Synchronous Dynamic Random Access Memory (DDR SDRAM) (as part of memory/storage 36 in FIG. 1B). It will be understood that other operating systems and other digital I/O components and configurations can readily be employed in the alternative, and this exemplary configuration is not in anyway intended to be limiting on the scope of this technology.

One or more digital I/O Cards 46. This card is required to connect the laptop computer with the PCMCIA or USB port at one end and drive the reed relays at the other end. The number of I/O channels needed depends on applications. Each channel must be able to send events at rates of about 60 Hz or higher. In one exemplary implementation, the PC-CARD-D24/CTR3 digital I/O card was selected. It has 3 ports with eight channels for each port. All 24 channels are programmable as input or output channels. The output high is 3.0 volts minimum at 2.5 mA and the output low is 0.4 volts max at 2.5 mA. Alternatively, digital I/O boxes 62 and 64, such as the Sealevel SEA I/O model 410 or model 430 can be used for this purpose. These digital boxes provide much the same functionality as the digital I/O cards, but have either 8 channels (in the model 410) or 16 channels (in the model 430).

Plurality of Reed Relays 60 shown in reed relay circuit unit 50 (and provided with a 24 VDC power supply). The mechanical reed relay circuits selected in LOOPSIM must be drivable by the digital I/O card. In this exemplary implementation, a compact Single Pole Single Throw (SPST) reed relay 60 that is drivable with the PCCARD-D24/CTR3 card was used. The nominal current of the SPST reed relay is 20 mA at 5 VDC. Optionally, 24 VDC power supply 51 can be included to provide the required voltage for input to the controller, instead of using the 24 VDC power supply of the Input File.

Cable Connectors (not separately identified in FIG. 2). Normal 22-gauge cables are used to connect the PC-CARD-D24/CTR3 digital I/O card(s) (or digital I/O boxes), the reed relays, Input File, and the controller input.

LOOPSIM is designed to provide loop inputs to controller cabinets and traffic event data collection systems for testing and training purposes. It supports channel connection tests, vehicle arrival pattern simulations, roadway traffic emulations features, and interactive simulation (event data replay responsive to controller feedback). Channel connection tests are necessary to determine whether the test system has been correctly set up before formal tests. Some traffic control or operation algorithms must be tested with known arrival patterns. The vehicle arrival pattern simulations feature provides direct support for such tests. Most frequently, a new algorithm is best tested with traffic data collected from designated roadways. The roadway traffic emulations feature reads a loop event data file recorded by the DEDAC system, which was developed in a previous study to collect individual vehicle event data from loops, or the ALEDA system, which is a new system recently developed at the STAR Lab for loop event data collection and analysis, and replay the data to emulate the roadway traffic exactly to the controller and the traffic event data collection system. When recorded event data are used to evaluate traffic control plans including adaptive control algorithms, LOOPSIM can replay the recorded data in a responsive manner, based on controller feedback, which makes the evaluations of traffic signal control plans more reliable and efficient. As shown in FIG. 2, the event data recorded can provide a data source of traffic signal indications 59.

User Interface

Figure 3:
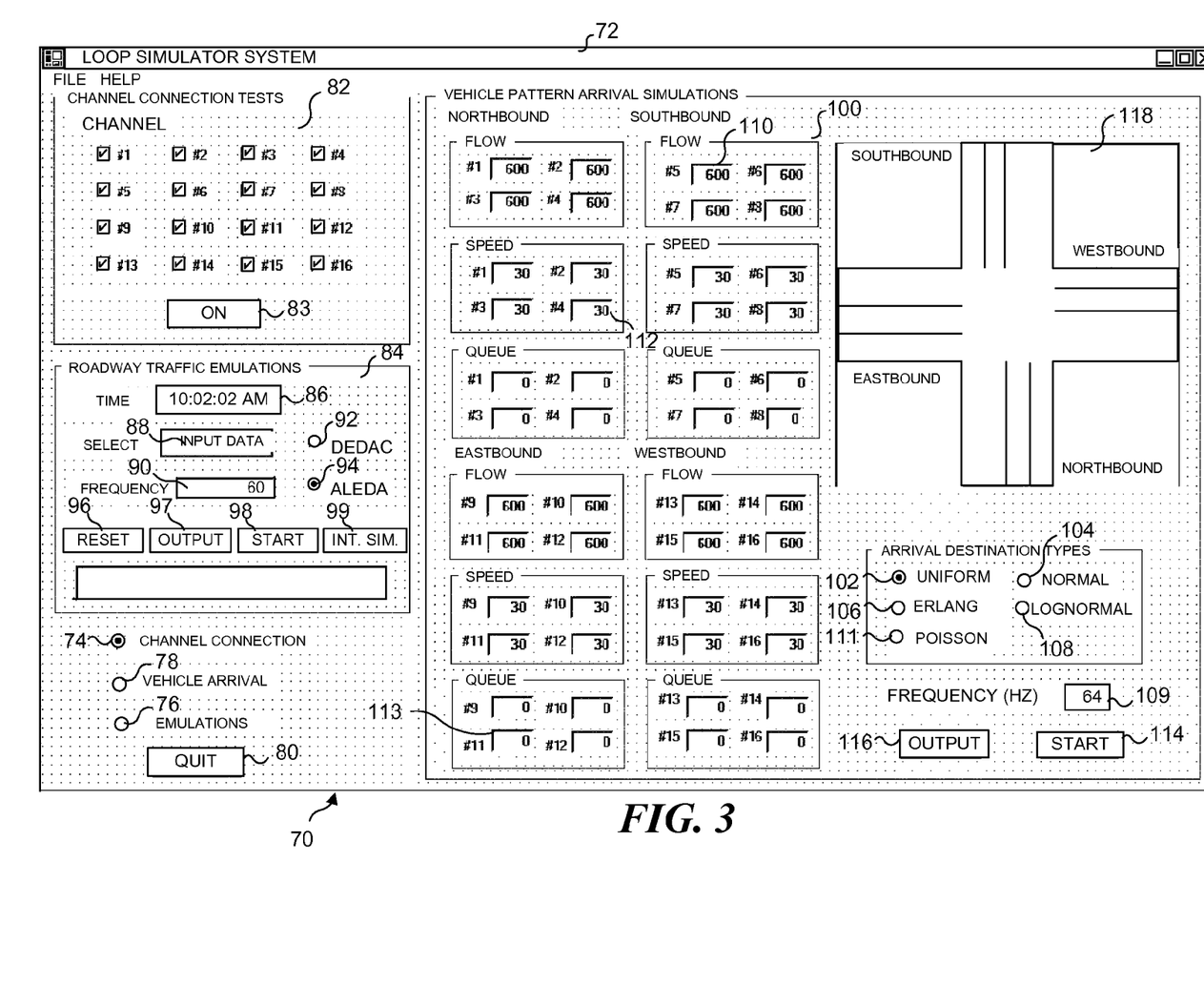
FIG. 3 is an exemplary embodiment of LOOPSIM's main user interface.

An exemplary main user interface 70 for LOOPSIM is shown in FIG. 3. It contains graphical display and input components that support channel connection tests, vehicle arrival pattern simulations, roadway traffic emulation features, and interactive simulation.

User interface 70 includes a title bar 72 with the conventional controls for minimizing, maximizing, and closing a graphic window. Several different functions can be activated by a user selecting one of three radio buttons, including a radio button 74 to activate Channel Connections Tests, a radio button 76 to activate Vehicle Arrival Tests, and a radio button 78 to activate emulation testing. A user can close the LOOPSIM software program by selecting a "Quit" control 80.

Channel Connection Tests—The main purpose of a channel connection test section 82 in the user interface is to check the operation of every channel before actual testing. It is recommended that users check the status of every channel, using this feature, before using other LOOPSIM features to ensure that each channel of interest is properly connected in the system.

Before conducting the channel connection or continuity tests, a user needs to choose the channels to test by selecting the check boxes of desired channels listed on the main user interface in channel connection test section 82. Then, pushing an "ON" control button 83 will cause each checked channel to switch to the low voltage status. Recall that a low voltage represents the "on" status of the virtual loop to the controller. After the "ON" button is clicked, it changes to an "OFF" control button. Once the "OFF" control button is clicked, the channel connection tests terminate and the channels switch back to high voltage, i.e., off status.

Vehicle Arrival Pattern Simulations—Vehicle arrival patterns are important parameters for many simulation applications. The corridor simulation (CORSIM) package developed through the Federal Highway Administration (FHWA) uses a uniform distribution as the default arrival pattern for entry node vehicle generation. CORSIM has also made two other arrival distributions, normal and Erlang, available to model vehicle arrivals. As further options, a user can select either a lognormal or a Poisson arrival distribution. Radio buttons 102, 104, 106, 108, and 111 are provided to select one of these distributions (i.e., uniform, normal, and Erlang, lognormal, or Poisson, respectively) to be used in a Vehicle Pattern Arrival Simulations section 100. The Vehicle Pattern Arrival Simulations section is divided into Northbound, Southbound, Eastbound, and Westbound sections, showing the parameters input for the different channels assigned to each of these sections.

Many traffic control and assignment algorithms are also based on certain assumptions of vehicle arrival patterns. To facilitate the testing of such algorithms, any one of these five vehicle arrival distributions can be selected by a user. A user can click the appropriate radio button 102, 104, 106, 108, or 111 to select the desired vehicle pattern arrival distribution for the test, and LOOPSIM will create a loop event data sequence by output of digital logic levels that are used to control the reed relays so that the input signals ready by the traffic controller follows the designated distribution.

The example of uniform arrival pattern is employed to illustrate how to use this feature. A user needs to specify an hourly traffic volume (in vehicles/hour) as for example, as indicated at a reference number 110 and average speed (in mph) for each channel or lane on the LOOPSIM interface, as indicated by a reference number 112, any queue parameter for each channel of interest, as indicated by the example at a reference number 113, and then can enter a frequency (Hz) for the selected distribution in an input box 109. These parameters will be used to calculate the time headways or intervals between consecutive vehicles and the scan counts for each vehicle based on the vehicle length distribution, as has been observed by other researchers. Vehicle queues on each approach are also displayed on the LOOPSIM interface, for example, as indicated in a section 105, for channels 1-4. Start and output control buttons 114 and 116 are included at the bottom of the section. A graphic illustration of the lanes in an exemplary intersection being simulated is included in a section 118.

Roadway Traffic Emulations—This feature, several aspects of which are included in a section 84 of user interface 70, enables the recreation of true traffic situations for in-laboratory tests and training. There are two advantages to this feature, including: (1) test input that can be controlled to satisfy the specific purpose of a test by choosing the right data set recorded at the right time and location; and, (2) a chosen data set can be used as standard input for evaluating the performance of different systems or estimation models being tested, so that the evaluation results are fair and comparable for the various tests.

The Roadway Traffic Emulations of section 84 include a time indication 86 for the test data being used, a text box 88 for indicating the input data to be used, a text box 90 for entering the frequency of the test data, radio buttons 92 and 94 for selecting either a DEDAC system or an ALEDA system for the test, and control buttons 96, 97, 98, and 99, for selecting a reset, an output of the test data, a start of the test, and an interactive simulation, respectively.

Because of the ability to control the test input, LOOPSIM can be used to test the performance of real-time traffic applications. For example, before a new speed estimation algorithm using single-loop outputs is deployed, it must be tested, preferably using field-recorded loop event data. With the roadway traffic emulations feature, this test can be easily conducted. Suppose several loop event data sets collected by the ALEDA system from inductive loop stations on U.S. Interstate Highway 5 are available. To test the new speed estimation algorithm implemented in a Type 170 compatible traffic controller, a user simply selects the most appropriate data set and uses LOOPSIM to replay this previously recorded data set to recreate the true traffic flow situation at the time the data were recorded. Since the ground truth event data are known based on knowledge of the real-world conditions, evaluation of the algorithm's performance becomes much easier and compelling.

Interactive Simulation—To support the development and analysis of signal control plans, the output of the traffic signal indication system must be known to simulate vehicle arrivals and departures at signalized intersections. LOOPSIM includes a feedback function from the controller to the laptop computer to enable event data replay in responding to controller feedback. This interactive simulation feature (selected with control button 99) makes LOOPSIM more powerful for testing a variety of signal control algorithms. For example, LOOPSIM is able to test the performance of adaptive signal control algorithms using field-recorded vehicle arrival data in a laboratory. Traffic signal indications data can also be recorded for use in testing control algorithms interactively.

Software Logic and Software Architecture

Figure 7:
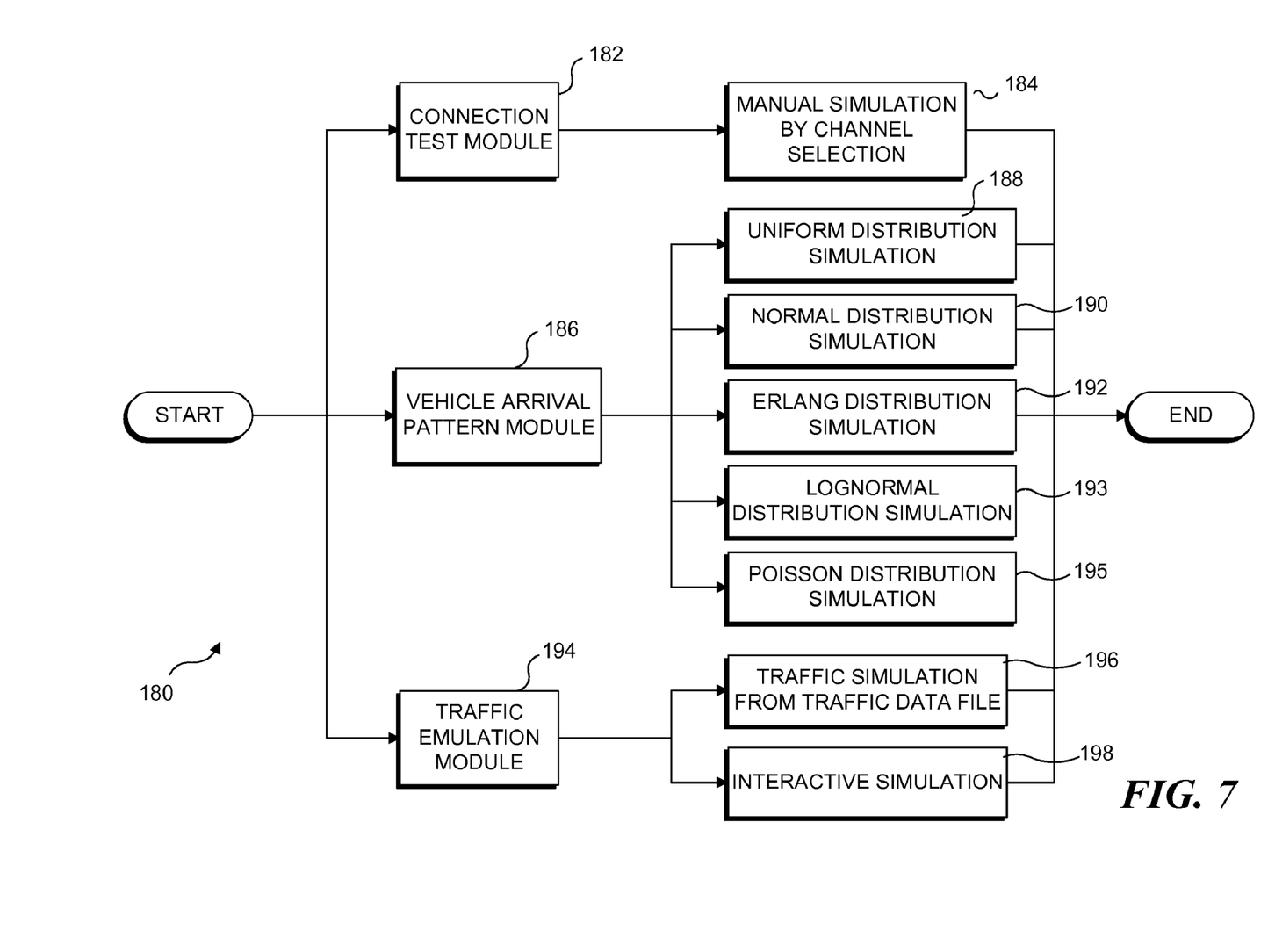
FIG. 7 is a flowchart showing exemplary work processes of the LOOPSIM software.

FIG. 7 is a block diagram 180 illustrating the functionality of the software logic. In FIG. 7, the software logic includes a connection test module 182, a vehicle arrival pattern module 186, and a traffic emulation module 194. When running LOOPSIM, the user selects one of these three modules. Initially, a user will normally select connection test module 182 and will carryout a manual simulation based upon channels selected by the user, as indicated in a block 184. Once the connection test module has confirmed that continuity and proper connectivity in each channel of interest, the user may choose to selectively run vehicle arrival pattern module 186 and will have the option to choose a uniform distribution simulation 188, or a normal distribution simulation 190, or an Erlang distribution simulation 192, or a lognormal distribution simulation 193, or a Poisson distribution simulation 195. Alternatively, the user can selectively run traffic emulation module 194. In this case, the user can selectively choose to run a traffic simulation using previously recorded traffic flow data for the input as indicated in a block 196, or can run an interactive simulation, as indicated in a block 198, which can use traffic signal indications data that was also previously recorded at a controller installed on an actual roadway.

Components for LOOPSIM with Feedback Function

Figure 8:
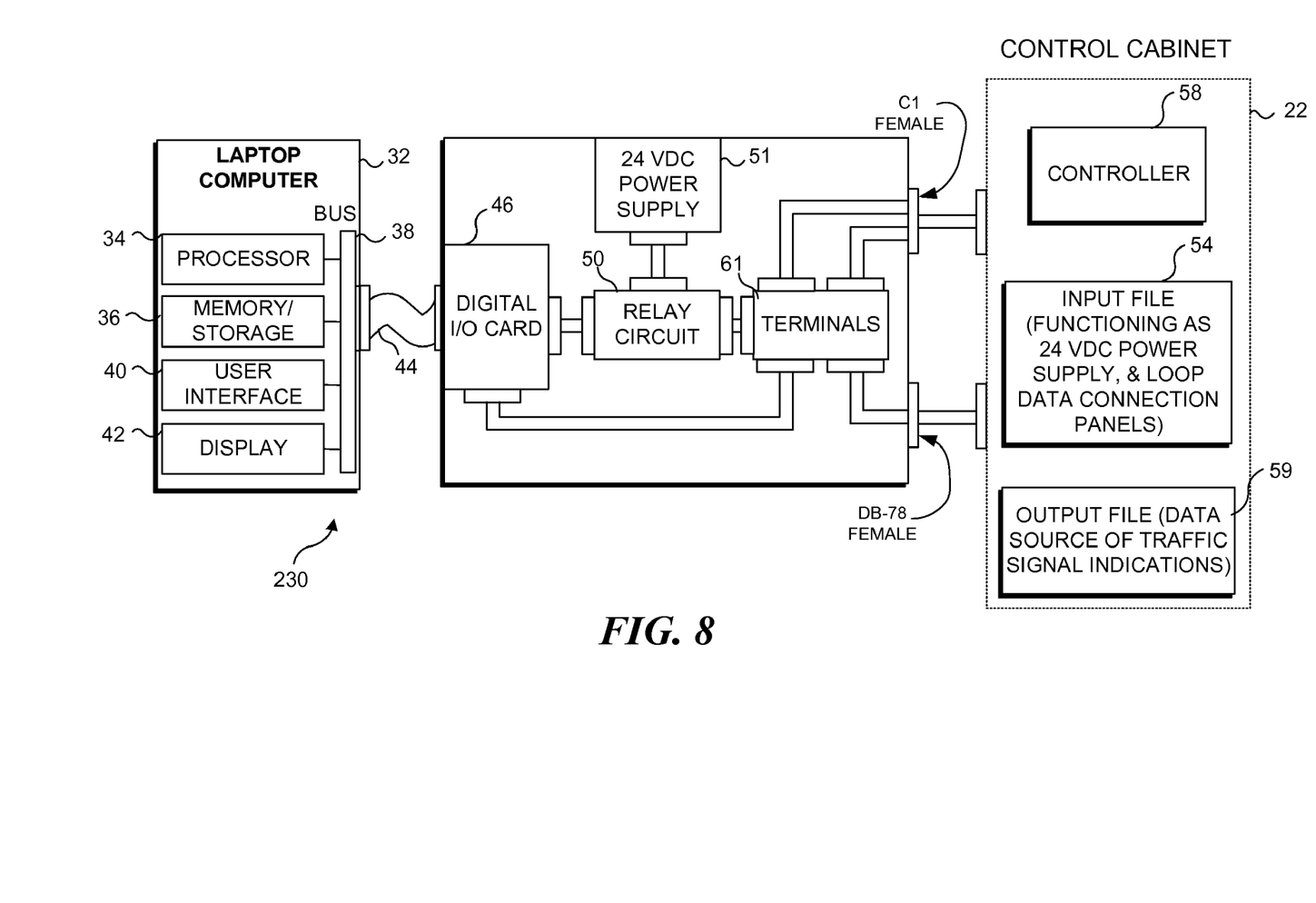
FIG. 8 is a schematic block diagram illustrating the additional hardware architecture to implement a feedback function.

The feedback function in LOOPSIM uses a hardware architecture 230 as illustrated in the exemplary block diagram shown in FIG. 8, to connect the controller or Output File in the control cabinet back to a laptop. The digital I/O adapter could be dedicated to this feedback function, or this feedback signal could be returned over channels in the digital I/O adapter used for the signal generating function. As indicated by block diagram 200 in FIG. 8, the software architecture runs under the control of an application manager 202. The logic branches to the feature selected by the user. If the user has chosen to run a connection test (CT) feature 204, the user is expected to select the channels to be tested, as indicated in a block 206. A plurality of CT algorithms 208 are then executed to determine if the selected channels are properly connected and have continuity, as explained herein.

If the user selects a vehicle pattern arrival (VPA) feature 210 in the application manager user interface (which is shown in FIG. 3), the user will be enabled to enter speed and traffic flow parameters 212 for each desired channel. Next, the user is able to select a desired traffic distribution from among the uniform, normal, Erlang, lognormal, and Poisson traffic distributions, at a block 214. Once provided with the user selected parameters, the program runs VPA algorithms, as indicated in a block 216.

Selection of a traffic emulation (TE) feature 222 next enables the user to make a selection of event data, as indicated in a block 224, which can selectively use previously recorded traffic event data files 225 to run a simulation using actual data produced by traffic flow on a roadway that were recorded using the DEDAC or ALEDA system. The user can further select an event simulation, as indicated in a block 226, or an interactive simulation, as indicated in a block 227. Using the selected simulation, TE algorithms are applied to produce the traffic emulation feature. CT algorithms 208, VPA algorithms 216, and TE algorithms 228 each provide their output to a frequency control module 218. The frequency control module drives a signal generator module 220 to produce the simulated output signal corresponding to an induction loop for the VPA feature or the TE feature, and is used to confirm the connectivity of each selected channel for the CT feature, including the interaction of these channels with the frequency control module and the signal generator module.

Figure 9:
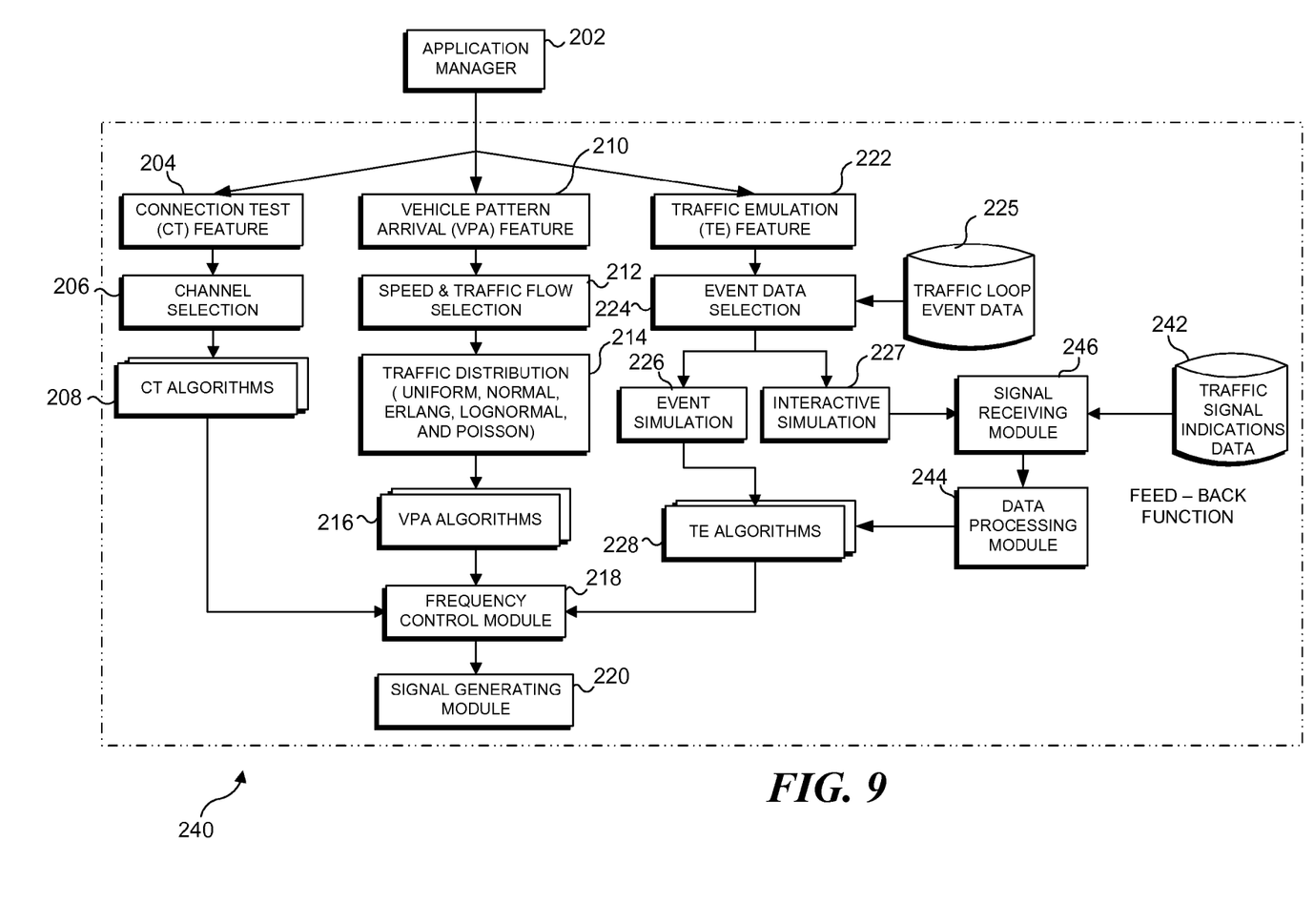
FIG. 9 is a block diagram showing the software architecture for an embodiment of LOOPSIM with the feedback function.

As illustrated in FIG. 9, the feedback function works in parallel with the signal generating function when TE feature 222 is running and the user has selected the interactive simulation in block 227. The selection of the interactive simulation results in traffic signal indication data 242 being input to a signal receiving module 246 and processed as discussed below, in a data processing module 244. The data processing module produces a signal input to the TE algorithms in block 228. When enabled, the feedback function receives the output signals from the control cabinet for the traffic signal indications data, and the data processing module processes these signals (e.g., performing rectification, sampling, and transformation), and passes the result for use by the TE algorithms to produce input for the responsive detector signal generating function. The traffic signal indications data indicate the timing for one or more traffic lights changing state, i.e., indication of when the green, yellow, red, and any turn arrow lights are energized. At the time that the traffic event data are recorded for traffic flow over an actual roadway, the corresponding traffic signal data for that roadway can also be recorded to produce the traffic signal indication data. The term "interactive simulation" refers to a simulation that simulates loop outputs based not only on recorded inductive loop event data, but also on feed-back traffic signal indications data. For example, when LOOPSIM replays recorded loop event data, it interacts with the current traffic signal indication data. Thus, if a traffic signal is green, then LOOPSIM can allow the passage of certain numbers of vehicles during a simulation, until the traffic signal changes to yellow, and then, to red.

When enabled to provide the feedback function, an exemplary embodiment of LOOPSIM includes the following devices:

1. laptop computer 32 (or other computing device) on which is installed the LOOPSIM software application;

2. digital Input/Output (I/O) card 46 or other digital I/O adapters for both the signal-generating function and the feedback function;

3. reed relay circuit unit 50;

4. 24 VDC power supply 54 (optionally, 24 VDC power supply 51 can be used instead of this 24 VDC power supply in the control cabinet (i.e., instead of the DEUs Input File power supply);

5. data source of signal status (i.e., the Output File in a control cabinet or the controller output port); and 6. connection cables 44 and others (not separately identified) extending between components 1-5.

Terminals 61 are included for coupling cables to a C1 female connector and to a DB-78 female connector, where the other ends of these cables are coupled to the control cabinet.

Notes on Exemplary Implementation

A current version of LOOPSIM was developed as an exemplary embodiment using Microsoft Corporation's Visual C#.NET™ technology and the additional Universal Library documents from the manufacturer of the digital input/output device. The remaining discussion refers to this exemplary embodiment, but is not intended to be limiting in regard to the scope of this novel approach. The exemplary program was executable on Microsoft Corporation's Windows 2000™ (or on compatible operating systems), but could readily be adapted for execution on other operating systems.

Since a controller typically scans a loop detector's output at 60 Hz, LOOPSIM should be able to simulate and record loop detector event data at a frequency of 60 Hz or higher. Thus, a high-resolution software timer is required in the LOOPSIM implementation. A timer is a program component that enables programmers to specify a recurring interval at which the elapsed event is raised in computer applications. A multimedia timer was used in LOOPSIM for more accurate event timing. Multimedia timer services enable applications to schedule timer events with the greatest resolution (or accuracy) possible for the hardware platform. Such a timer runs on its own thread and moves among threads to handle the raised elapsed event, resulting in greater accuracy than other timers in raising the event on time. The multimedia timer resolution on the hardware platform tested can accurately support simulation at up to 90 Hz.

A multithreading program technique was used to control parallel tasks in LOOPSIM. Of the three ports with the PC-CARD-D24/CTR3 digital I/O card, two ports (sixteen channels) were programmed as output channels and can send signals out simultaneously at a high frequency (60 Hz or higher). This functionality makes LOOPSIM capable of simultaneously simulating sixteen inductive loops.

Since loop detectors work independently, each channel is managed by one independent thread in LOOPSIM. Because the typical digital logic level voltage output from computer ports is between 0 volts and 5 volts, an external power supply of 24 volts is needed for simulating the "off" status of an inductive loop. The Input File of the Model 332 traffic control cabinet can be used as the external power supply for high voltage signals. A reed relay is used to switch between the high voltage from the Input File when simulating the "off" status and the low voltage from the PC-CARD-D24/CTR3 digital I/O card when simulating the "on" status for each channel. The compact SPST reed relay drivable with the PC-CARD-D24/CTR3 digital I/O card was selected in this implementation of LOOPSIM to conduct this function.

System Testing

The reliability and accuracy of LOOPSIM was evaluated in the STAR Lab at the University of Washington. The evaluation was conducted through two types of tests, including: (1) connection tests; and, (2) performance & accuracy tests.

Connection Tests

Connection tests are desirable before LOOPSIM is used to conduct more complicated tests. As the first step of the LOOPSIM evaluation, connection tests were performed to ensure that LOOPSIM could work together with the available test devices, including the Model 332 control cabinet and the Type 170 traffic controller. LOOPSIM was connected between the Type 170 traffic controller and the Input File of the Model 332 control cabinet. This connection follows exactly the design of the exemplary embodiment of LOOPSIM as shown in FIG. 2.

The connections for the sixteen output channels of LOOPSIM were tested individually to ensure that they were properly connected. Then random combinations of the output channels were tested to make sure that channels did not interfere with each other. These tests were accomplished with the channel connection tests feature of LOOPSIM, as discussed above in connection with FIG. 3. A multi-meter was used to measure the voltage of signals feeding the Type 170 controller. The voltage corresponding to the simulated "on" status was verified to be very close to 0 volts and the voltage in response to the simulated "off" status was found to be approximately 24 volts. Additionally, the ALEDA system can be used to record the outputs of each virtual loop detector. All the simulated "on" and "off" statuses were successfully captured by the ALEDA system. These test results concluded that the design of LOOPSIM was reasonable, and that all sixteen output channels were successfully connected and worked independently.

Performance & Accuracy Tests

This set of tests was conducted to evaluate the performance and accuracy of LOOPSIM when using the vehicle arrival pattern simulations and the roadway traffic emulation features. Performance refers to whether loop event data can be simulated at the desired frequency without significant delays. Accuracy indicates whether a simulated event data sequence is preserved at the controller input side.

Without changing the connections set up in the connection tests, two more tests were conducted, including one for the vehicle arrival pattern simulations feature (only uniform distribution was tested), and another for the roadway traffic emulation feature. The results for both tests can be easily verified by comparing the original data file in LOOPSIM with the data file received by the ALEDA system. The only difference between these two tests was that the original data file for testing the feature of vehicle arrival pattern simulations was generated by LOOPSIM based on a uniform distribution of vehicle arrival times and the observed vehicle length distribution, and the test data for roadway traffic emulation were previously recorded by the ALEDA system at a known location and time. Since a Type 170 traffic controller typically scans a loop detector at 60 Hz, both LOOPSIM and the ALEDA system were configured to work at 60 Hz for this test.

Figure 4:
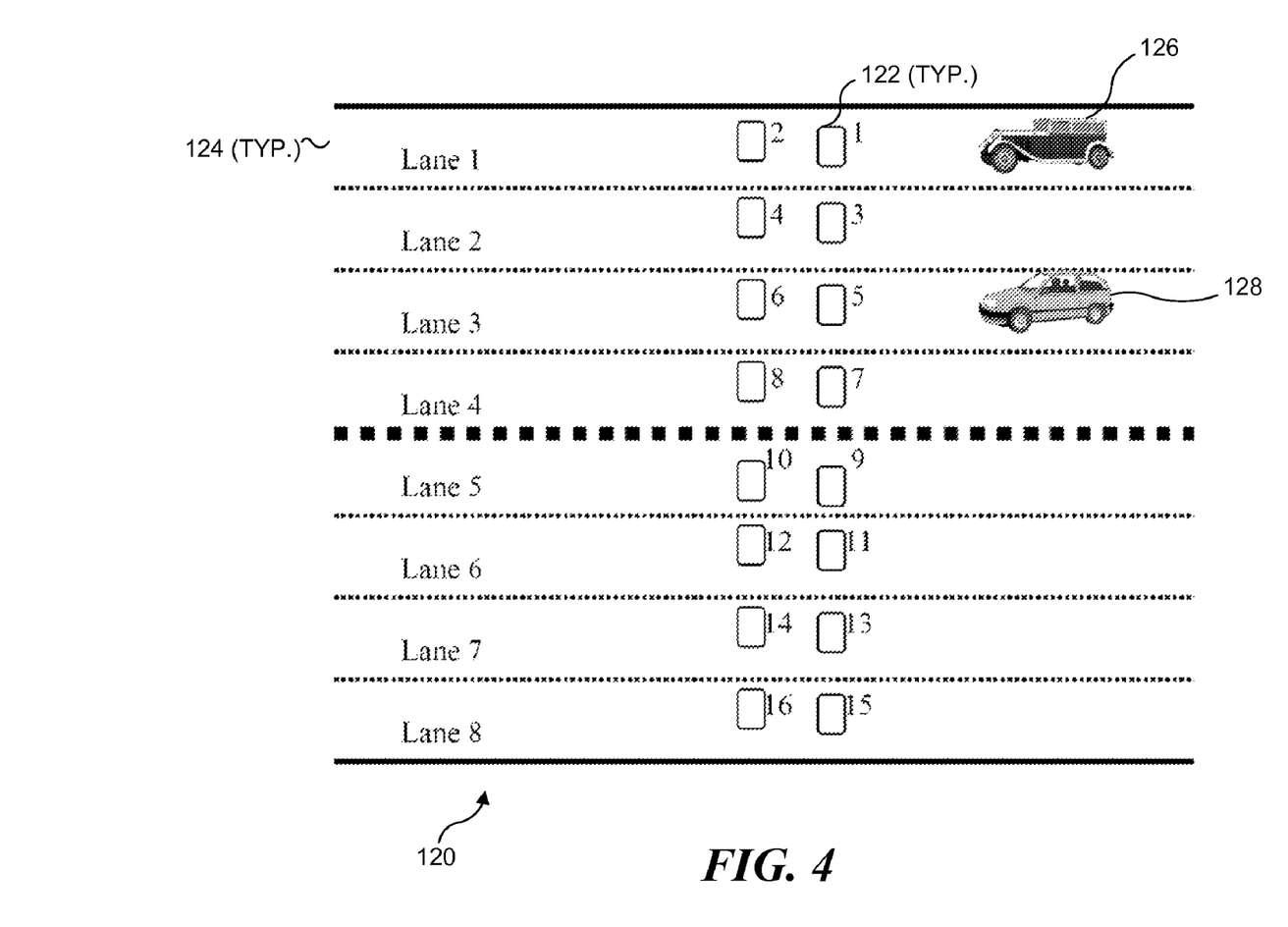
FIG. 4 illustrates an exemplary loop detector layout for a vehicle arrival pattern simulations test.
Figure 5A:
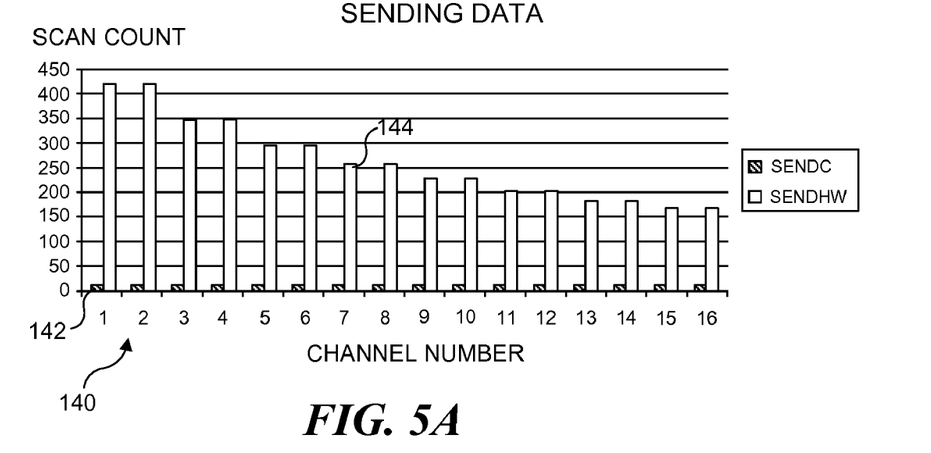
Figure 5B:
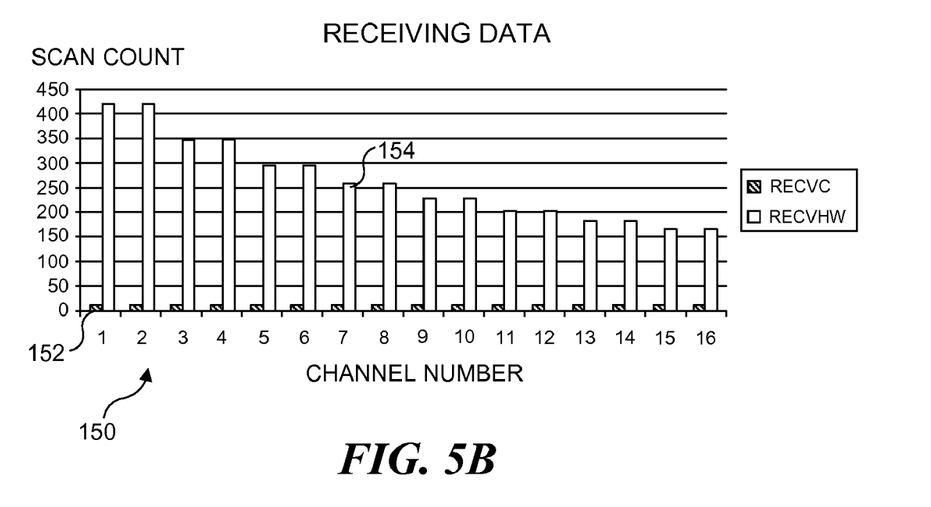

The vehicle arrival pattern simulations feature was tested first. For example, (as shown in FIG. 4), it is assumed that there was a roadway section 120 with eight lanes, and each lane 124 had two single loops 122 deployed to respond to the presence of vehicles 126 and 128. Channels 1 through 8 corresponded to the first eight loops and channels 9 through 16 corresponded to the second eight loops for lane 1 through lane 4 and lane 5 through lane 8, respectively. The hourly vehicle volume was 500 for lane 1. From lane 1 through lane 8, volume increases by 100 with each increase of lane number. Average traffic speeds across lanes were assumed to be constant at 60 mph. The test lasted 15 minutes. The comparisons between the LOOPSIM created data and the data received by the ALEDA system are shown in graphs 140 and 150 of FIGS. 5A and 5B. The SENDC and RECVC curves (examples of which are indicated by reference numbers 142 and 152) represent the scan counts/car from sending and receiving data files, respectively. Similarly, vehicle time headways from sending and receiving data files are shown by SENDHW and RECVHW curves, respectively, as indicated, for example, by reference numbers 144 and 154. There was a time delay of 16 ms. The mean absolute error between the two data sets was zero. The sent event data sequence was preserved exactly in the received data file. These test results indicate that LOOPSIM performed well at the 60 Hz working frequency and that its accuracy was 100%.

Similarly, the roadway traffic emulation feature was tested with the loop event data collected by the DEDAC system at times from 13:14:43 to 14:02:22, on May 16, 2002, from station ES-163R on Interstate Highway 5. The simulated signal sequence by LOOPSIM and the received signal sequence by the DEDAC system are shown in graphs 160 and 170 of FIGS. 6A and 6B, respectively. Note that the status of one loop detector is recorded in one bit. One byte contains the statuses of eight loop detectors at a particular moment. All sixteen channels are therefore recorded in two bytes (each byte is shown as a number range from 0 to 255).

Figure 6A:
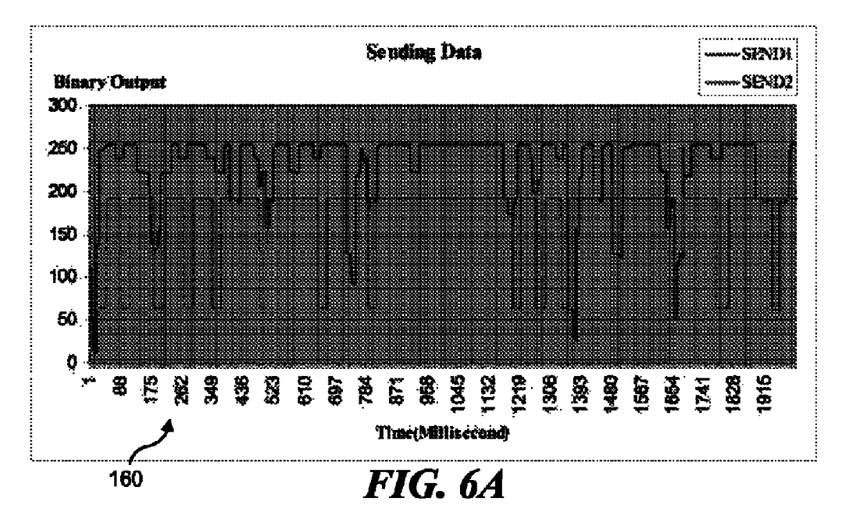
FIG. 6A shows the field recorded event data sent by LOOPSIM and FIG. 6B shows the event data received by the ALEDA System during the test (wherein RECV1 equals binary traffic event data for loop numbers 1-8 received by ALEDA at 60 Hz, and RECV2 equals binary traffic event data for loop numbers 9-16 received by ALEDA at 60 Hz)
Figure 6B:
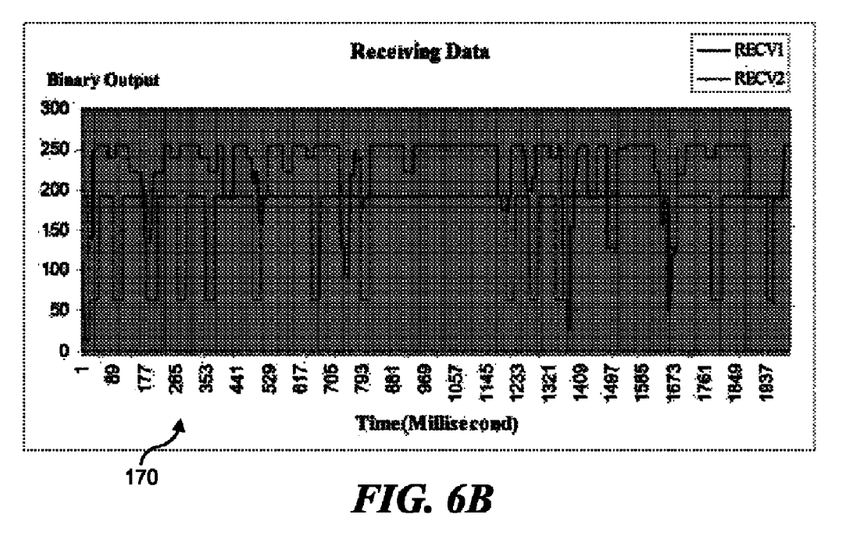

In FIG. 6A, a SEND1 curve represents the status of loops 1 through 8, and a SEND2 curve represents the status of loops 9 through 16, as sent by LOOPSIM. Correspondingly, in FIG. 6B, a RECV1 curve shows the received status of loops 1 through 8, and a RECV2 curve denotes the received status of loops 9 through 16. The time interval between any two consecutive points is approximately 16.7 ms. Comparison between the corresponding curves did not find any differences except the consistent system delay of about 16 ms. This test supports the conclusion reached from the first test, i.e., LOOPSIM performed superbly at 60 Hz with complete accuracy and sequential order of the test data set.

CONCLUSIONS

Inductive loops are the most widely deployed traffic sensors in the existing road infrastructure. They are a major data source for ATIS and ATMS. Most actuated intersection signal control systems and freeway monitoring systems use loop detectors for traffic detection, e.g., adaptive signal control systems and ramp metering systems. To assure the effectiveness of these systems, both hardware and software should be tested before deployment. Field testing is generally not the first choice, because any failure of the test system may cost too much. Therefore, in-laboratory testing is preferred. However, live loop detector inputs may not be available in laboratories, and this deficiency may seriously reduce the diversity of test methods and the liability of the test results.

The hardware components of LOOPSIM include a laptop computer (or other computing device) with a USB or PCM-CIA port (or other appropriate I/O port), a digital data I/O card (or other digital I/O interface), and relays for converting digital logic levels to actual traffic controller voltage levels. Such a simple configuration is very affordable for research institutes and universities. Although laptop computer 32 was used for the computing device in the prototype embodiment, it will be understood that virtually any computing device with a processor and memory can be employed for executing the LOOPSIM software program. While a portable computing device provides the advantage of being readily moved into the field to record actual traffic flow data for a roadway when coupled to a traffic controller, there is no inherent requirement that the computing device be portable. Also, it may be possible to remotely collect real traffic flow data using wired or wireless networks, as will be readily evident to a person of ordinary skill in the art.

LOOPSIM is capable of generating output events of loop detectors at a high frequency (60 Hz and above). Test results of LOOPSIM concluded that the system is reliable and accurate. LOOPSIM contains four major features: channel connection tests, vehicle arrival pattern simulations, roadway traffic emulations, and interactive simulations. These features enable a variety of system tests in laboratories at a low cost and make performance evaluations more accurate. It should be appreciated that LOOPSIM can include more simulation features and can be tested with different hardware settings, including other types of controllers and cabinets. There is a great potential to use LOOPSIM for advanced traffic research and education and to further develop its functionality. Since detection signals from many new traffic sensors are in the same form as those from inductive loops, LOOPSIM can be used to simulate these sensor signals as well.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A system for simulating and evaluating vehicular traffic flow, comprising:

(a) a computing device having a processor and a memory in which machine instructions are stored for carrying out a plurality of functions;

(b) an interface configured to couple the computing device to a controller used for traffic monitoring and control, the interface providing an output signal having a voltage range as required for input to the controller and simulating a vehicle detection signal from a traffic sensor, the simulated vehicle detection signal emulating the output of at least one induction loop that responds to the ferrous mass of a vehicle disposed proximate to the induction loop, the emulated output including a pre-recorded traffic flow sequence of multiple vehicles that was detected on a roadway; and (c) the processor executing the machine instructions, which cause the processor to enable a user to selectively control one or more parameters relating to a simulation of traffic flow past a vehicular traffic sensor, to enable evaluation and study of traffic flow based upon the response of the controller to the simulated vehicle detection signal.

2. The system of claim 1, wherein the interface includes: (a) a digital input/output module that couples to the computing device and provides a control signal corresponding to a state of a digital signal applied to the digital input/output module by the computing device; (b) a power supply for supplying a voltage corresponding to that required for input to the controller or another controller; and (c) a relay that is coupled to the power supply and to the digital input/output module, so that contacts on the relay are opened or closed based on a state of the digital signal, the voltage of the power supply being coupled through the contacts of the relay to provide the output signal that is used for simulating the vehicle detection signal.

3. The system of claim 1, wherein the machine instructions executing on the processor enable the user to selectively record a signal from a controller that is responding to a traffic sensor in a roadway, producing digital data that are stored in a storage accessible by the computing device.

4. The system of claim 3, wherein the machine instructions executing on the processor enable the user to selectively employ the digital data that were stored, to produce the output signal for coupling to the controller, thereby simulating an actual flow of vehicular traffic when currently producing the output signal.

5. The system of claim 1, wherein the computing device is sized and configured to be readily portable, to enable the computing device and the interface to be readily transported by hand.

6. The system of claim 1, wherein the machine instructions executing on the processor enable the user to select one of a plurality of different traffic arrival distributions as a parameter for use in producing the output signal.

7. The system of claim 6, wherein the plurality of different traffic arrival distributions from which the user can select include at least two from the group consisting of: (a) a uniform traffic flow distribution; (b) a normal traffic flow distribution; (c) an Erlang traffic flow distribution; (d) a lognormal traffic flow distribution; and (e) a Poisson traffic flow distribution.

8. The system of claim 1, wherein the interface comprises a plurality of channels, each channel being used for simulating traffic flow at a different traffic sensor, the interface producing a corresponding plurality of channel output signals, each channel output signal having a voltage range as required for input to a corresponding plurality of channels of the controller, for simulating a vehicle detection signal from a traffic sensor for the channel.

9. The system of claim 8, wherein the machine instructions executing on the processor enable the user to select one or more specific channels for providing channel output signals to the controller.

10. The system of claim 1, wherein the machine instructions executing on the processor further enable a feedback function to be implemented that employs traffic signal indications data during an interactive simulation in connection with corresponding traffic event data.

11. The system of claim 1, wherein the machine instructions executing on the processor further enable a connection test to be performed that evaluates the connections between the controller and the system.

12. The system of claim 1, wherein the machine instructions executing on the processor enable a vehicle pattern arrival feature to be implemented with the controller using the output signal.

13. The system of claim 1, wherein the machine instructions executing on the processor enable a traffic emulation feature to be implemented with the controller using the output signal.

14. A system for use in simulating input signals indicative of vehicular traffic flow, for testing and evaluating traffic monitoring and control schemes in a laboratory, comprising:

(a) a traffic controller that is normally employed for monitoring or controlling traffic flow along a roadway;

(b) a computing device having a processor, and a memory that stores machine instructions;

(c) an input/output interface having a plurality of channels for converting digital logic level signals to output signals, so that a voltage range of each output signal is suitable for input to a channel of the traffic controller to simulate an input signal normally supplied to the multi-channel traffic controller by a vehicle sensor in a roadway, the input/output interface also being adapted to convert input data supplied to a roadway traffic controller at said voltage range, to digital data for storage in a storage accessible by the computing device; and (d) a user interface that enables input by a user of one or more parameters for controlling the system to facilitate either recording input event data or for controlling the output signal that is produced to simulate detection of vehicles on a roadway by one or more vehicle sensors, the machine instructions executed by the processor producing one or more digital logic level signals applied to the input/output interface for simulating traffic flow in one or more of the plurality of channels, to enable evaluation and study of traffic flow conditions based upon the response of the traffic controller to one or more output signals from the input/output interface, wherein each output signal emulates the output of at least one induction loop that responds to the ferrous mass of a vehicle disposed proximate to the induction loop, the emulated output including a pre-recorded traffic flow sequence of multiple vehicles that was detected on a roadway.

15. The system of claim 14, wherein the input/output interface is adapted to connect to an actual vehicle sensor that is monitoring vehicular traffic flow on a roadway, and to convert a vehicle detection signal produced by the vehicle sensor to digital logic levels that are stored as the input event data, for use in subsequently simulating vehicular traffic flow corresponding to the actual vehicular traffic flow that was previously monitored on the roadway by the vehicle sensor.

16. The system of claim 15, wherein the machine instructions executed by the processor cause the user interface to display an option that enables the user to selectively employ the input event data that are stored for producing one or more output signals from the input/output interface corresponding to the input event data, so that a resulting simulated traffic flow corresponds to actual vehicular traffic flow that was detected on a roadway.

17. The system of claim 14, wherein the machine instructions executed by the processor further cause the user interface to display an option that enables the user to select one of the following predefined traffic distributions for use in producing the one or more output signals applied to the input of the traffic controller: (a) a uniform traffic distribution; (b) a normal traffic distribution; (c) an Erlang traffic distribution; (d) a lognormal traffic distribution; and (e) a Poisson traffic distribution.

18. The system of claim 14, wherein the machine instructions executed by the processor cause the user interface to display an option that enables the user to select a connection test option to test connections between the input/output interface and one or more channels of the multi-channel traffic controller.

19. The system of claim 14, wherein the input/output interface comprises: (a) a plurality of relays, including one relay for each of the plurality of channels; (b) a power supply coupled to contacts of each of the plurality of relays, the power supply providing a voltage range for the output signals of the input/output interface; and (c) a digital interface card that couples to the computing device and provides a relay control signal to control each of the plurality of relays in response to the digital logic level signals provided by the computing device.

20. The system of claim 14, wherein the machine instructions executed by the processor further enable a feedback function to be implemented that employs traffic signal indications data during an interactive simulation in connection with corresponding traffic event data.

21. The system of claim 14, wherein the machine instructions executed by the processor further cause the user interface to enable the user to select at least one parameter or option selected from the group consisting of: (a) specify each of one or more channels of the multi-channel traffic controller that will receive an output signal from the input/output interface; (b) a source of data that will be employed for the digital logic level signals used to produce the one or more output signals; (c) a frequency of the digital logic level signals and thus, of the one or more output signals; (d) a specific traffic distribution that will be used for vehicle pattern arrival simulations; (e) an option to select one of a plurality of different types of multi-channel traffic controllers as the multi-channel traffic controller being used in the system; (f) a speed of vehicles on a roadway during a simulation of traffic flow for each channel of the one or more channels; (g) a number of vehicles per hour of traffic flow for each of the one or more channels; and (h) an option to run either a channel connection test, a vehicle pattern arrival test, or a traffic emulation test with the system.

* * * * *